(12) United States Patent
Forrester

(10) Patent No.: US 9,426,569 B2
(45) Date of Patent: Aug. 23, 2016

(54) AUDIO SIGNAL BANDWIDTH TO CODEC BANDWIDTH ANALYSIS AND RESPONSE

(71) Applicant: Research In Motion Limited, Waterloo (CA)

(72) Inventor: Chris Forrester, Kitchener, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 413 days.

(21) Appl. No.: 13/916,662

(22) Filed: Jun. 13, 2013

(65) Prior Publication Data

US 2014/0369508 A1      Dec. 18, 2014

(51) Int. Cl.
| | | |
|---|---|---|
| G06F 17/00 | (2006.01) | |
| H04R 3/04 | (2006.01) | |
| G06F 3/16 | (2006.01) | |
| G10L 19/24 | (2013.01) | |

(52) U.S. Cl.
CPC H04R 3/04 (2013.01); G06F 3/162 (2013.01); G10L 19/24 (2013.01); G10H 2240/051 (2013.01)

(58) Field of Classification Search
CPC ..... G01H 3/14; G06F 3/162; G10H 2240/051
USPC ........................ 381/56, 98–99, 23, 22; 700/94
See application file for complete search history.

(56) References Cited

U.S. PATENT DOCUMENTS

| | | | |
|---|---|---|---|
| 7,006,787 B1 * | 2/2006 | Sherif | G10L 21/0364 375/211 |
| 7,620,052 B2 | 11/2009 | Witzel et al. | |
| 2006/0136080 A1 * | 6/2006 | Williams | H04S 7/40 700/94 |
| 2007/0026841 A1 | 2/2007 | DeMoor | |
| 2008/0181211 A1 | 7/2008 | Parolkar et al. | |
| 2009/0051812 A1 | 2/2009 | Wang | |
| 2009/0182563 A1 | 7/2009 | Schobben et al. | |
| 2009/0287480 A1 | 11/2009 | Mapes-Riordan et al. | |
| 2010/0158260 A1 * | 6/2010 | Huddart | H04R 5/04 381/56 |
| 2011/0013779 A1 * | 1/2011 | Arthur | H04R 29/00 381/56 |
| 2011/0202353 A1 | 8/2011 | Neuendorf et al. | |
| 2013/0083203 A1 | 4/2013 | Barrett et al. | |

OTHER PUBLICATIONS

EESR dated Nov. 25, 2013 for European Application No. 13171921.3.

(Continued)

*Primary Examiner* — Disler Paul
(74) *Attorney, Agent, or Firm* — Thomas Grzesik; Fleit Gibbons Gutman Bongini & Bianco, P.L.

(57) ABSTRACT

The bandwidth of a codec is compared with a determined bandwidth of the output signal produced by the codec. If the bandwidths match, then an audio profile of the apparatus is set to correspond to the established bandwidths and a corresponding icon is rendered on a display of the apparatus. If the signal bandwidth is narrower, than the codec bandwidth, then the audio profile of the apparatus is set to a narrower audio profile and a corresponding icon is rendered on the display of the apparatus. The bandwidth of the signal processed by the codec may be determined in several different ways and the narrower audio profile includes reduced bandwidth, reduced gain, or reduced dynamic range.

20 Claims, 5 Drawing Sheets

(56) References Cited

OTHER PUBLICATIONS

D'Alessandro, B., et al., "MP3 Bit Rate Quality Detection through Frequency Spectrum Analysis," Proceedings of the 11th ACM workshop on Multimedia and Security, Sep. 7, 2009, pp. 57-61, Copyright 2009 ACM 978-1-60558-492-8/09/09. DOI: 10.1145/1597828. ISBN: 978-1-60-558492-8.

Hicsonmez, S., et al., "Audio Codec identification through payload sampling," 2011 IEEE International Workshop on Information Forensics and Security, Nov. 29, 2011, pp. 1-6, DOI: 10.1109/WIFS.20116123128. ISBN: 978-1-4577-1017-9. Copyright 2011 IEEE.

Yang, R., et al., "Detecting double compression of audio signal," Media forensics and security II, proceedings of SPIE-IS&T Electronic Imaging. Jan. 2010, vol. 7541. Copyright 2010 SPIE-IS&T. DOI: 10.1117/12.838695.

GSM Association, "Miminum Technical Requirements for Use of the HD Voice Logo with CDMA2000 Issued by GSMA," Version 1.0, Mar. 22, 2013, copyright 2013 GSM Association.

Partial European Search report dated Feb. 8, 2013 for European Application No. 13171921.3.

International Telecommunication Union, "Frame error robust narrow-band and wide band embedded variable bit-rate coding of speech and audio from 8-32 kbit/s", ITU-T, Series G: Transmission system and media, Digital systems and networks, digital terminal equipments—coding of voice and audio signals, Jun. 2008, pp. 1-246.G. 718, XP003028199.

\* cited by examiner

AUDIO SIGNAL BANDWIDTH TO CODEC BANDWIDTH ANALYSIS AND RESPONSE

The present disclosure generally relates to multiple rate and adaptive rate COder-DECoder (codec) operation and in particular to analysis and responses to variable signal bandwidths and variable codec bandwidths.

BACKGROUND

Codecs are a crucial component of modern communication systems, including cellular communication systems, for compressing digitized voice and video signals prior to transmission and decompressing the compressed signals upon reception. G.711 is an ITU-T standard for audio companding released in 1972, and uses a pulse code modulation technique to provide narrow bandwidth (≈4 kHz) toll quality audio in the range of 300 Hz to 3400 Hz at a data rate of 64 Kbit/s. Legacy G.711 networks continue in operation to communicate voice and digital information such as fax and acoustic modem data on public switched landline networks. The Adaptive Multi-Rate (AMR) codec standardized in 3GPP, has a bandwidth (≈4 kHz) similar to G.711, provides an adaptive rate narrowband audio codec and is used in existing 2G, 3G and 4G cellular voice networks. G.722.2 is an ITU-T standard and provides an Adaptive Multi-Rate WideBand (AMR-WB) codec for cellular networks and implements a wider bandwidth than AMR. "HD Voice" is implemented using AMR-WB and has a wider bandwidth (≈8 kHz) than toll quality voice and occupies a bandwidth range of 50 Hz to 7000 Hz. An IETF standard RFC 6716 defines the OPUS codec, which provides an adaptive rate codec with a maximum bandwidth wider than HD voice, having a full audio bandwidth (≈20 kHz) which occupies a bandwidth range of 20 Hz to 20 kHz. OPUS has the ability to change the audio bandwidth to adapt to changing network conditions, unlike AMR-WB and AMR.

If either or both near-end and far-end cell phones are configured for the narrower bandwidth AMR codec, then both cell phones select the narrower bandwidth codec. This selection may occur because one or both cell phones are only equipped with an AMR codec or one or both wireless links to a corresponding cellular tower network is limited to supporting only AMR. In this situation the audio profile of both cell phones is set for a narrower bandwidth voice signal.

If both near-end and far-end cell phones are equipped with AMR-WB codecs and the cell towers and corresponding wireless network links facilitate HD voice, then each cell phone negotiates the use of the AMR-WB codec and the wider bandwidth. The audio profile of each cell phone is configured for the wider bandwidth and an official HD voice logo may be rendered on the cell phone display. In this situation callers enjoy both a wider bandwidth higher quality audio signal than the narrower bandwidth audio signal provided by an AMR codec as well as the social status enhancement associated with a cell phone that renders the HD voice logo.

However, in some implementations even though both cell phones and both wireless networks coupled to the cell phones are capable of facilitating HD voice, an intervening network linking near-end and far-end networks may only be capable of toll quality voice. Since the intervening network communicates data used for cell phone codec negotiation, the cell phones detect that both have HD voice codecs and both networks links support HD voice, so HD voice communication is negotiated, the corresponding wider bandwidth audio profile selected and HD voice icon rendered. In this case however, the HD voice is transcoded into narrower bandwidth toll quality voice for communication through the intervening network and transcoded back to HD voice. Thus, both cell phones are properly configured for HD voice in accordance with negotiations facilitated by the networks associated with the cell phones, but the bandwidth is limited to toll quality voice because of the transcoding processes of an intervening network. Consequently the bandwidth of the audio signal between the cell phones is not matched to the codec bandwidth negotiated by the cell phones. This mismatch results in degraded audio, which has been described as "muddy". The muddy audio may actually sound worse than narrower bandwidth AMR because the wider bandwidth audio profile of HD voice does not filter out undesirable components that would otherwise be filtered if the audio profile was configured for narrower bandwidth audio. To compound matters, the degraded audio is produced while the HD voice icon is rendered.

This condition inappropriately reflects negatively on cell phone manufacturers and results in customer dissatisfaction, complaints and reduction in good will and customer loyalty. Often times users of the cell phones complain to the cell phone manufacturer about the reduced audio quality produced by their otherwise well-constructed and properly operating equipment. The customer has paid for a high quality audio signal but is not experiencing a high quality audio signal. Even more, the cell phone icon indicates a high quality audio signal is indeed being delivered. Nevertheless, the cell phone is operation properly in accordance with established conventions and requirements, and nothing can be done by a cell phone manufacturer to restore bandwidth losses introduced by intervening networks during the cell phone call.

Unlike legacy codecs such as G.711, AMR and AMR-WB, more modern audio codecs such as OPUS are able to adapt to network congestion by adapting the bandwidth of the audio signal when appropriate. However, the corresponding audio quality can occasionally change significantly during the duration of a call because of the adapting of the bandwidth. This occurs even when both cell phones use the same adaptive rate codec and a corresponding icon is rendered on the display indicative of the full bandwidth adaptive rate codec.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
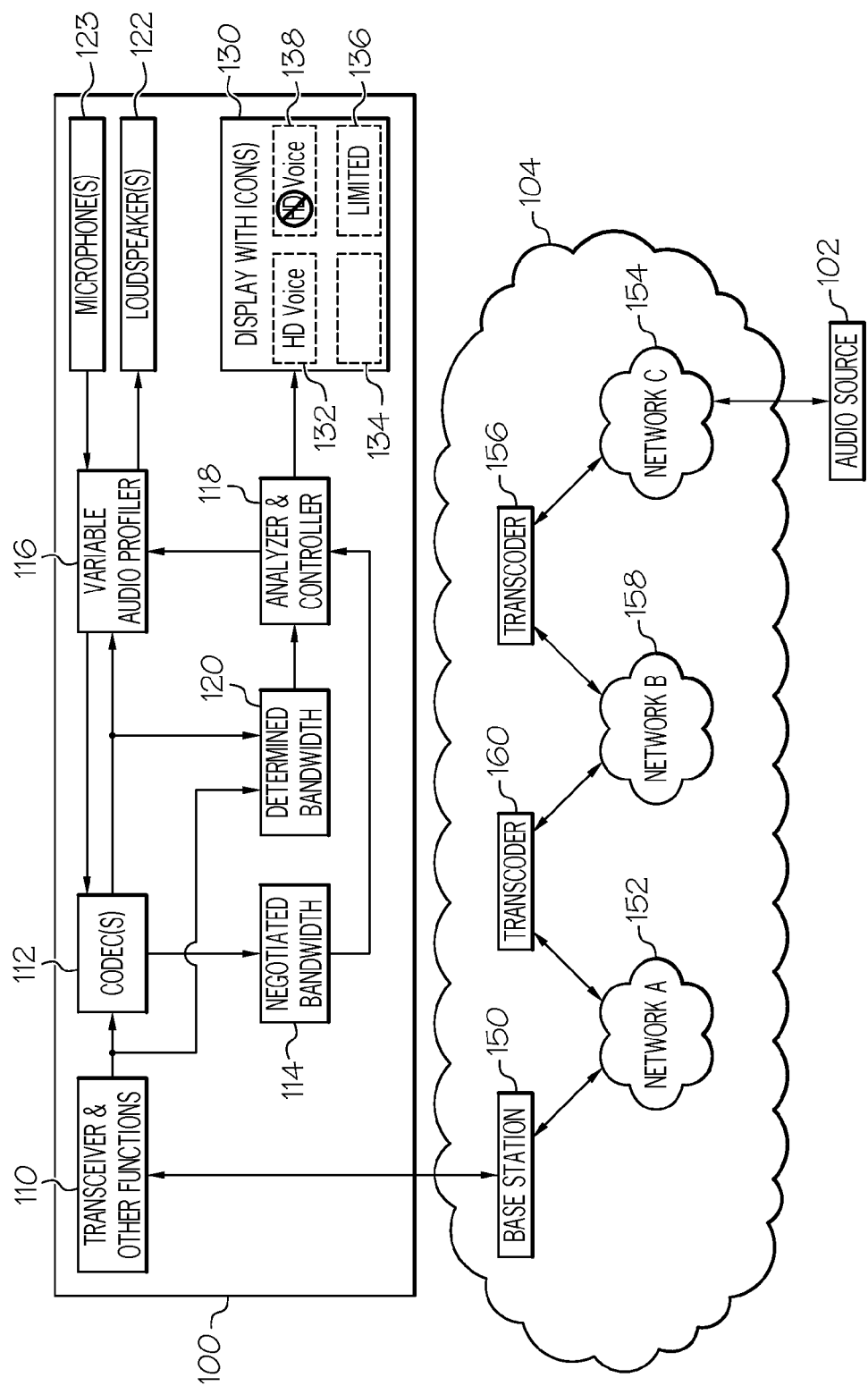
FIG. 1 illustrates a system having an apparatus for audio signal bandwidth to codec bandwidth analysis and response.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function. In the following discussion, "handheld" is used to describe items, such as "handheld devices," that are sized, shaped, designed or otherwise configured to be carried and operated while being held in a human hand.

Described below, in one example a method comprises determining if (or determining whether) a codec produces an output signal having a narrower bandwidth than a bandwidth of the codec, and modifying an output of a device including the codec (that is a device that includes the codec) in response to the determining. Modifying includes producing a narrowed output signal by narrowing an audio profile of the output signal and presenting the narrowed output signal upon the device. Narrowing includes filtering lower frequency components and/or higher frequency components of the output signal. Narrowing includes reducing at least one of a gain and a dynamic range of the output signal. Presenting includes presenting the narrowed output signal upon at least one loudspeaker of the device. The codec consumes power digitally processing a signal bandwidth corresponding to the bandwidth of the codec and the method further comprises conserving power by processing less signal bandwidth than the bandwidth of the codec in response to the determining. Modifying includes changing an icon display of the device. The method can further comprise determining if the output signal has a bandwidth corresponding to the bandwidth of the codec, and the modifying further includes rendering a first icon on a display of the device in response to the output signal having the bandwidth corresponding to the current bandwidth configuration, and at least one of not rendering the first icon, rendering a modified version of the first icon, and rendering a second icon in response to the input signal producing the output signal having the bandwidth narrower than the codec bandwidth. The determining includes determining that a payload of an input signal to the codec is indicative of the output signal having a bandwidth narrower than the bandwidth of the codec. The determining includes determining if a frequency spectrum of the output signal has a bandwidth narrower than the bandwidth of the codec. The determining includes determining if an upper frequency of the output signal is less than a target frequency of the bandwidth of the codec, and the modifying includes filtering lower frequency components of the output signal. The method may be included within computer instructions stored upon a non-transitory computer readable media.

In another example an apparatus comprises an analyzer for determining if a codec produces an output signal having a narrower bandwidth than a bandwidth of the codec, and a controller for modifying an output of the apparatus in response to the determining. A variable audio profiler coupled to the codec and the controller produces a narrowed output signal by narrowing an audio profile of the output signal in response to the determination, and a loudspeaker to annunciate an acoustic representation of the narrowed output signal. The analyzer further determines if the output signal has a second bandwidth corresponding to the bandwidth of the codec and the apparatus includes a display coupled to the controller for rendering a first icon in response to the output signal having the bandwidth corresponding to the bandwidth of the codec, and at least one of: terminating rendering of the first icon, rendering a modified version of the first icon, and rendering a second icon in response to the output signal having the bandwidth narrower than the bandwidth of the codec. The analyzer determines if an input payload of an input signal to the codec is indicative of a frequency spectrum less than the current bandwidth configuration. The analyzer determines if a frequency spectrum of the output signal is less than the current bandwidth configuration.

In another example, a method comprises establishing a bandwidth of an output signal of a codec, determining that the bandwidth has narrowed during reception of the output signal, and modifying an output of a device including the codec in response to the determining by at least one of: modifying an established audio profile for the output signal to produce a narrower output signal and annunciating the narrower output signal on a loudspeaker; and at least one of terminating rendering of a first icon, rendering a modified version of the first icon, and rendering a second icon on a display. The determining that the bandwidth has narrowed during reception of the output signal further comprises a second determining that the bandwidth has widened during reception of the output signal, and modifying the output of the device in response to the second determining by at least one of: annunciating the established audio profile on a loudspeaker; and at least one of rendering the first icon, rendering a modified version of the first icon, and terminating rendering the second icon on the display of the device.

The an example of description can illustrate the advantage of properly displaying an icon indicative of the signal received even though a codec decoding a signal the signal is set to for different type of signal. Thus, if the codec is set to receive a higher quality signal, such as an 8 kHz signal, and a lower quality signal, such as a 4 kHz signal, is received, then a lower quality icon will be rendered in place of a higher quality icon, thereby providing an appropriate indication of the signal. Also, if the codec is receiving a narrower signal than the codec bandwidth, then an example of description may advantageously modify the audio profile of the output signal produced by the codec with processes including narrowing the bandwidth, reducing the gain or reducing the dynamic range. Modifying the audio profile may include the advantage of improving the perceived quality of produced sound. The description also may include the advantage of conserving power when the bandwidth of the received signal is narrower than the codec bandwidth by processing less of the codec bandwidth, thereby conserving digital signal processing cycles, reducing power consumption, reducing heat generation and extending the life of a battery powered device.

FIG. 1 illustrates a system having an apparatus for signal bandwidth to codec bandwidth analysis and response. Apparatus 100 includes a device such as a stationary, portable or handheld electronic device annunciating audio. Such devices include pagers, personal digital assistants, e-readers, telephone, VoIP phone, cell phones, smart phones, super phones, tablets, convertible PCs, laptops, desktop PCs, workstations, gaming systems, music players video players, radios, televisions and other such devices. The annunciated audio (that is the audio that is output, transduced by a speaker, emitted, or otherwise generated in a form that it may be heard by a human being) is generated by audio source 102 using at least an encoder portion of the codec, which may be an apparatus similar to apparatus 100 and coupled to apparatus 100 through network 104. Apparatus 102 may be engaged in two-way communication with apparatus 100, or may be a broadcast only apparatus such as a broadcast or Internet based radio, television or other video or audio video station. Apparatus 100 has a transceiver 110 for interfacing with the network 104. Other functions are incorporated into the transceiver for implementing apparatus 100 and include power sources, user interface components such as keyboards and tracking devices, cameras, locations systems and other components known to those familiar in the art for implementing apparatus 100. In an example where apparatus 100 is a cell phone, transceiver 110 is a cellular transceiver able to implement at least one cellular protocol such as GSM, CDMA, Wi-MAX, TD-SCDMA or LTE and wirelessly interface with network 104. Transceiver 110 may also be a WiFi, Bluetooth, Zigbee or other type of transceiver for interfacing with the network.

A codec 112 is coupled to the transceiver and decodes a digital input signal to produce an output signal that comprises audio information in either an analog or a digital form adapted for modification by filter processes for changing the frequency contour of the output signal, compression processes for changing the dynamic range of the output signal and gain processes for changing the amplification of the output signal. The codec 112 may implement any of a number of codec standards known to those familiar with the art including G.711, AMR-WB, AMR and OPUS. Codec 112 negotiates a bandwidth with the network 104 in a manner known to those familiar with the art and produces a negotiated bandwidth signal 114. In one example, codec 112 includes a narrower bandwidth AMR codec and a wider bandwidth AMR-WB codec and the negotiation results in the selection of either the AMR or AMR-WB codec. In one example, a negotiated bandwidth could correspond to a narrower bandwidth 4 kHz audio signal or a wider bandwidth 8 kHz HD voice quality audio signal. The audio profile of the output of the codec is set by variable audio profiler 116 which is set by analyzer and controller 118.

Modification to the output signal includes changing, changing in part, adjusting and narrowing an audio profile of the output signal to produce a narrowed output signal. When transduced or annunciated by a loudspeaker, the narrowed output signal becomes an output of the device, in this case an audio output. Narrowing the audio profile can include modifications to filter bandwidth, amplifier gain, compression and mono vs. multi-channel audio (such as stereo). For example, if the codec is set to an 8 kHz bandwidth and the output signal contains a 4 kHz bandwidth signal, then the filter of the audio profile can be modified by narrowing the bandwidth and filter the high frequency components, the low frequency components or both with a narrower bandwidth filter in response thereto. In one example, since the received signal has reduced low frequency bass notes and high frequency treble notes, the audio profile can be narrowed to better filter out undesirable noise and other high and low frequency components that may be otherwise heard without the narrowed audio profile. Also, the gain component of the audio profile can be modified to decrease the amplitude of the output signal to enhance listening quality. In corresponding example, the audio profile reduces the volume so the output signal annunciated at a lower volume level. Furthermore, the dynamic range component of the audio profile can be modified to reduce the minimum and maximum sound levels produced by the signal. In a corresponding example, the louder sounds do not sound so loud and the quieter sounds will sound louder. Thus, a narrowed output signal may have a narrower frequency range, a lower gain and a reduced dynamic range, relative to the output signal of the codec. Those familiar with the art should appreciate that other forms of modification of the output signal of the codec are possible while remaining within the scope of this disclosure, including for example switching the audio system from stereo to mono.

Additionally, a system operating at an 8 kHz bandwidth when a 4 kHz bandwidth signal is present expends unnecessary resources in processing the signals beyond the 4 kHz bandwidth. The unnecessarily expended resources include computer or digital signal processing cycles as well as power consumed and heat generated by the consumed power. Thus, signal processing resources expended on processing signals either above the 4 kHz band or below the 4 kHz or both, can be conserved or idled, thereby conserving signal processing resources and making the resources available for other signal processing needs, and/or reducing power consumption and heat generation.

Bandwidth determiner 120 determines the audio signal bandwidth produced by the input signal to the codec by either analysis and decoding of the payload parameters of the input signal to the codec or determining a bandwidth or frequency spectrum of the output signal of the codec to be either less than or substantially equivalent to the bandwidth of the codec. Payload determination by bandwidth determiner 120 analyzes the signal received by the codec to determine the bandwidth of the received audio signal. The payload may include signals such as pitch period and number and size of voice packets which may be analyzed to determine the bandwidth of the received audio using processes known to those familiar with the art. The output of the variable audio profiler 116 is provided loudspeakers 122 for annunciating by the apparatus.

Analyzer and controller 118 is coupled to variable audio profiler 116. In one example, if the negotiated bandwidth and the determined bandwidth correspond to 8 kHz then the variable audio profiler may be set for an 8 kHz HD profile at specified 8 kHz audio gain and compression levels. If the negotiated bandwidth and the determined bandwidth correspond to 4 kHz then the variable audio profiler may be set for a 4 kHz mono audio profile at specified 4 kHz audio gain and compression levels. If the negotiated bandwidth corresponds to 8 kHz and the determined bandwidth corresponds to 4 kHz then, in accordance with this disclosure, the variable audio profiler is set for a mono audio profile and the specified 8 kHz audio gain and compression levels may be modified to accommodate the reduced bandwidth. For example, the gain and compression can be reduced and bandwidth tailored for a 4 kHz profile rather than an 8 kHz AMR-WB profile. In one example the 4 kHz profile may be based on characteristics arising from G.711 transcoding, in another example the 4 kHz profile may be reused from an existing AMR profile, in other examples other profiles may be used while remaining within the scope of the disclosure.

Analyzer and controller 118 is coupled to a display with icons 130 having icons 132-138. The display is an output of the device, the display can be modified by changing, changing in part, adjusting and setting the icons rendered on the display in response to determining that the codec is producing an output signal that has a narrower bandwidth than the bandwidth of the codec. A user may be notified by techniques in addition to or other than icons, but icons are described here as a convenient and effective technique for user notification. A rendered icon 132-138 on display 130 is indicative of the annunciated audio signal. For example, if the negotiated bandwidth and the determined bandwidth correspond to 8 kHz, then HD voice icon 132 is rendered. If the negotiated bandwidth and the determined bandwidth correspond to 4 kHz, then no icon 134 or the limited 136 is rendered. If the negotiated bandwidth corresponds to 8 kHz and the determined bandwidth corresponds to 4 kHz, then the first icon, the HD voice icon 132 is not rendered and no icon 134 is rendered, or a modified version of the HD voice icon 138 is rendered, or a second icon, such as limited icon 136 is rendered. This notifies a user of the apparatus that the codec is configured for a wider bandwidth audio signal, but a narrower bandwidth audio signal is being received. A user may be similarly or equivalently notified in ways other than or in addition to rendering one or more icons, such as by displaying a message in text, rendering an animation, illuminating an indicator light, superimposing a notification sound in the audio, and so forth.

In typical situations, if the codec negotiated bandwidth is 8 kHz, then the determined bandwidth will also be 8 kHz. However, the details of network 104 show one example where the negotiated bandwidth is 8 kHz and the determined bandwidth is 4 kHz. Apparatus 100 negotiates the codec bandwidth and protocol with base station 150 which is coupled to network A 152 of network 104. If audio source 102 were coupled directly to network A then the negotiated bandwidth and the determined bandwidth would properly correspond in accordance with the codec related standards. However, if the audio source 102 is coupled to apparatus 100 through a stitched network, then the negotiated bandwidth can be wider than the determined bandwidth. For example, if network A 152 and network C 154 were wider bandwidth AMR-WB networks but were stitched through a narrower bandwidth toll quality G.711 network B 158, then apparatus 100 would negotiate a wider bandwidth codec because both apparatus 100 and audio source 102 have wider bandwidth codec, networks A and C facilitate AMR-WB and network B passes the data that facilitates the negotiation. However, transcoder 156 narrows the 8 kHz signal from audio source 102 to 4 kHz, eliminating characteristics of the audio signal that provide for a HD voice experience, and transcoder 160 encodes the 4 kHz signal from transcoder 156 back to an 8 kHz signal, albeit with a narrower 4 kHz bandwidth.

Apparatus 100 has the advantage of mitigating the situation where a wider bandwidth codec process has been negotiated with the network, but a narrower bandwidth signal is provided by the network by either or both providing an icon indicating a corresponding degradation in audio signal and narrowing the audio profile in accordance with the narrower signal received from the network.

Microphone(s) 123 are also coupled to the coder input of codec 112 through variable audio profiler 116 for encoding audio signals reception by far end audio source 102. This provides for adjusting the profile of the audio received by microphone(s) 123 in response to determinations made for the speakers annunciated on speakers 122 if the network is determined to have symmetrical transmission characteristics between device 100 and device 102, thereby potentially improving the received quality of audio transmitted by device 100. Furthermore, echo cancelation can be enhanced with the information that the signals received by microphone(s) 122 have been modified by the variable audio profiler 116.

Figure 2:
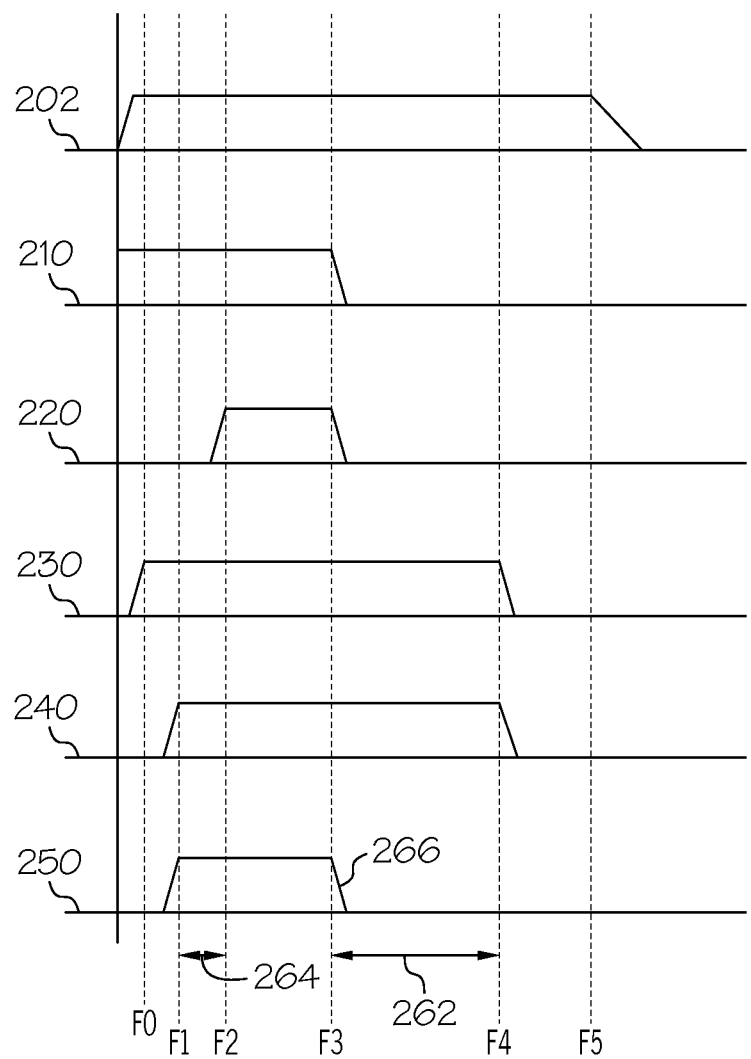
FIG. 2 illustrates representative frequency and bandwidth diagrams.

FIG. 2 illustrates representative frequency and bandwidth diagrams. In an example using AMR and AMR-WB systems, F0 corresponds to 50 Hz, a lower frequency of the AMR-WB codec, F1 corresponds to 150 Hz, a lower limit of the AMR-WB spectrum used in an exemplary audio system, F2 corresponds typically to about 300 Hz, the lower frequency of the G.711 and AMR systems, F3 corresponds to 3400 Hz, the upper frequency of the G.711 and AMR systems, F4 corresponds to 7000 Hz, the upper frequency of the AMR-WB system and F5 corresponds to 20 kHz, the upper limit of human hearing and the upper frequency of the OPUS system. Line 200 shows a bandwidth of an audio signal at the audio source before anti-alias filtering and encoding by a codec. Line 210 shows the representative bandwidth of a G.711 signal after anti-aliasing filtering and codec encoding, and represents the bandwidth of an input signal for decoding by a codec receiving the signal. Note that the frequency spectrum above F3 is filtered, but the frequency spectrum below F2 remains. Line 210 represents the bandwidth of a signal output by a G.711 decoder. Note that the bandwidth is shown to extend from 0 Hz to 3400 Hz. Line 220 represents a 4 kHz audio profile and bandwidth. Note that for illustrative purposes, this bandwidth substantially corresponds to a bandwidth of either a G.711 or an AMR system. Note further that the higher frequency filtering at F3 is matched to the signal 210 and the frequency content below F2 is filtered. Line 230 shows the representative bandwidth of an AMR-WB signal after anti-aliasing filtering and codec encoding, and represents the bandwidth of an input signal for decoding by a codec receiving the signal. Note that the frequency spectrum above F4 is filtered, but the frequency spectrum between F0 and F1 remains. Line 240 represents the audio profile or bandwidth filtering for an AMR-WB signal output by a codec. Note that the higher frequency filtering at F4 is matched to the signal 230 and the frequency content below F1 is filtered. Line 210 also shows the representative bandwidth of the signal received by apparatus 100 through stitched and transcoded network 104. The bandwidth is narrowed by the transcoding process. The codec has a wider negotiated bandwidth than the signal provided to the codec. If the wider bandwidth audio profile, line 240, corresponding to the codec negotiated bandwidth were applied to the narrower bandwidth of signal 210, then the signal of line 250 results. The signal of line 220 corresponds to varying the audio profile to produce a narrowed output signal by narrowing a bandwidth of the output signal of a wide bandwidth codec in accordance with this description.

Note that line 250 shows that there is substantially no frequency spectrum between frequencies F3 and F4, 262, but there is frequency spectrum present between frequencies F1 and F2, 264. Thus in a system that does not practice the description herein, the audio presentation of line 250 has a sound quality described as "muddy" because it has all the frequency content of toll quality speech between F2 and F3, plus lower frequency components between F1 and F2, but none of the higher frequency components between F3 and F4. The addition of lower frequency content without the corresponding higher frequency content results in a perceived spectrum imbalance that has been described as sounding muddy and worse than toll quality audio.

The present description has the advantage of determining the mismatch between the signal bandwidth and the codec bandwidth and applying an appropriate audio profile to the audio produced by the codec. In this example, the narrower 4 kHz bandwidth audio profile of line 220 would be applied even though the codec has a wider 8 kHz negotiated bandwidth associated with the AMR-WB standard. Thus, the frequency components below F2 are filtered and the muddy sound is mitigated. The bandwidth of the input signal can be detected in any of several ways including determining that the frequency spectrum of the signal output by the codec is narrower than the current or negotiated bandwidth configuration of the codec, by determining a substantial absence of frequency content above F3 or an absence of frequency content above a target frequency such as F3 plus a guard band, or by monitoring the payload associated with the codec input signal or determining if the upper roll off characteristic 266 of the signal output by the codec is indicative of a narrower bandwidth anti-aliasing filter coupled to the encoding codec.

Figure 3:
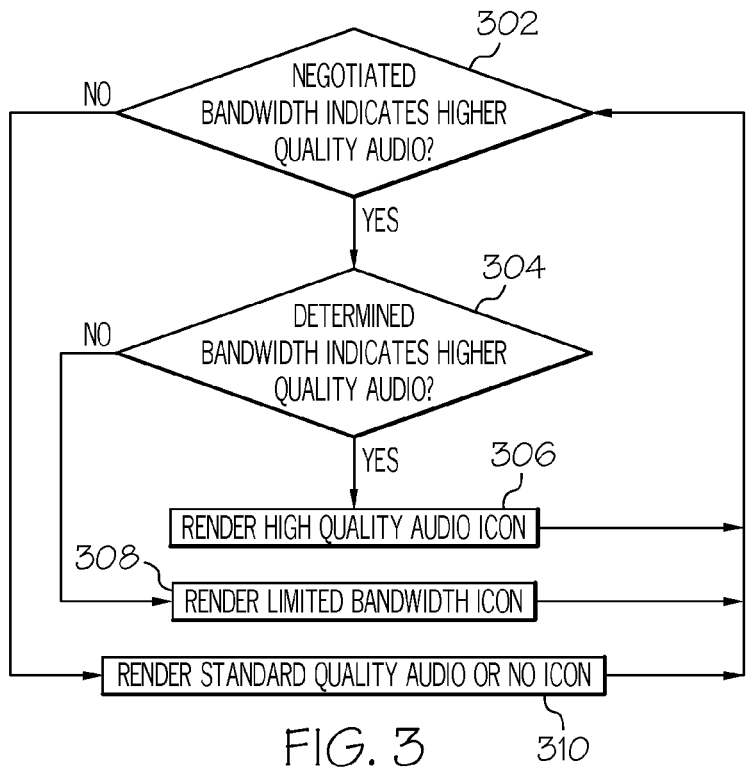
FIG. 3 illustrates a representative flow diagram for controlling rendering of icons in response to analysis of signal bandwidth and codec bandwidth.

FIG. 3 illustrates a representative flow diagram for controlling rendering of icons in response to analysis of signal bandwidth and codec bandwidth. Step 302 determines if the negotiated codec bandwidth indicates a wider bandwidth signal indicative of higher quality audio. If not, then a standard quality icon, such as icon 136 is rendered, or no icon, as shown by 134, is rendered at step 310. Otherwise, step 304 determines if the bandwidth of the input signal received by the codec is wider and indicative of higher quality audio. If so, then a high quality audio icon, such as HD voice icon 132, is rendered at step 306. Otherwise step 308 renders a limited bandwidth icon such as icon 136, or a modified high quality icon such as icon 138, or no icon at all as shown by 134. Note that step 308 also terminates rendering the high quality audio icon rendered at step 306, and alternately step 306 terminates rendering of limited bandwidth icon at step 308. In a system having a changing bandwidth, such as in some adaptive rate codecs, for example OPUS, where the quality of the audio can vary during a conversation, the processes of FIG. 3 can operated continuously during the call (or established connection), thereby updating the rendered icons during the call in response to variations in bandwidth. For this description the term call refers to a circuit established through a circuit switched network between the communicating devices or a packet connection established between the communicating devices, or a connection involving a combination of both circuit and packet connections. In another example of a more static system, the bandwidths are not changed after establishing the call and a rendered icon can remain rendered during the call. In a modification of the other example, a limited spectrum signal may make it difficult to determine if the bandwidth of the input signal is constrained or if it is merely the desired signal. For example, a 1 kHz tone may indeed be delivered at a high quality bandwidth, and in this case the high quality icon is rendered in during the interval of indetermination because of the affirmative determination made as step 302. During the indeterminate interval, step 304 performs continuous analysis until a determination can be made, and once made the appropriate icon rendered at step 306 or 308 for the duration of the call.

In another example, the robustness of the system may be enhanced by classifying the type of signal being received. For example, a first audio profile may be applied to a voice signal, a second audio profile may be applied to a music signal and a third audio profile may be applied to an audio signal associated with a video signal.

Figure 4:
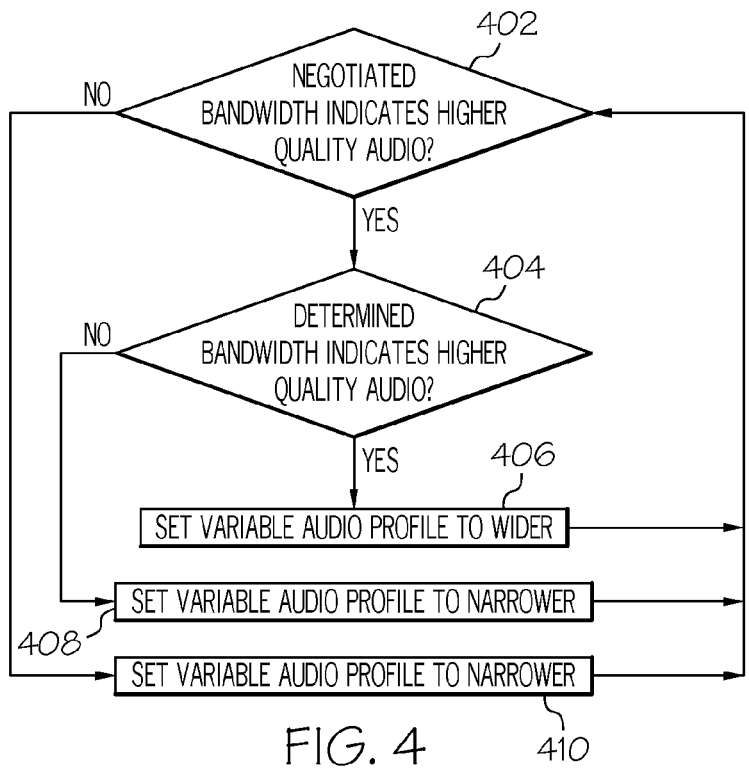
FIG. 4 illustrates a representative flow diagram for controlling the audio profile of the codec output in response to analysis of signal bandwidth and codec bandwidth.

FIG. 4 illustrates a representative flow diagram for controlling the audio profile of the codec output signal in response to analysis of signal bandwidth and codec bandwidth. Step 402 determines if the negotiated codec bandwidth indicates a wider bandwidth signal indicative of higher quality audio. If not, then step 410 sets the audio profile to a narrower audio profile, such as bandwidth 220, of the variable audio profiler 116. Otherwise, step 404 determines if the bandwidth of the output signal of the codec is wider and indicative of a second bandwidth corresponding to the bandwidth of the codec and a higher quality audio. If so, then step 406 sets the audio profile to higher quality audio profile including a wider bandwidth setting, such as bandwidth 240, of the variable audio profiler 116. Otherwise step 408 sets the audio profile to a narrower audio profile, such a bandwidth 220, of the variable audio profiler 116. In a system having a changing bandwidth, such as an adaptive rate codec, where the quality of the audio can vary during a conversation, the processes of FIG. 4 can operated continuously during the call, thereby updating the audio profile during the call in response to variations in bandwidth. In another example of a more static system, the bandwidths are not changed after establishing the call and the audio profile can remain during the call. In a modification of this other example, a limited spectrum signal may make it difficult to determine if the bandwidth of the input signal is constrained or if it is merely the desired signal. For example, a 1 kHz tone may indeed be delivered at a high quality bandwidth, and in this case the lower quality audio profile is set in during the interval of indetermination because of the limited bandwidth of the signal. During the indeterminate interval, step 404 performs continuous analysis until a determination can be made, and once made the appropriate audio profile set at step 406 or 408 for the duration of the call. Note further that variations in wider and narrower audio profile can include modifying the audio gain and compression as well as modification of mono/multi-channel audio characteristics.

It should be further noted that in one example relative to FIG. 3 and FIG. 4, the rendered icon corresponds to the set audio profile. However, during an interval of indetermination of the determined bandwidth, the high quality icon 132 may be rendered while the audio profile is set for a narrower bandwidth 220. This state may remain until a bandwidth determination is made.

Figure 5:
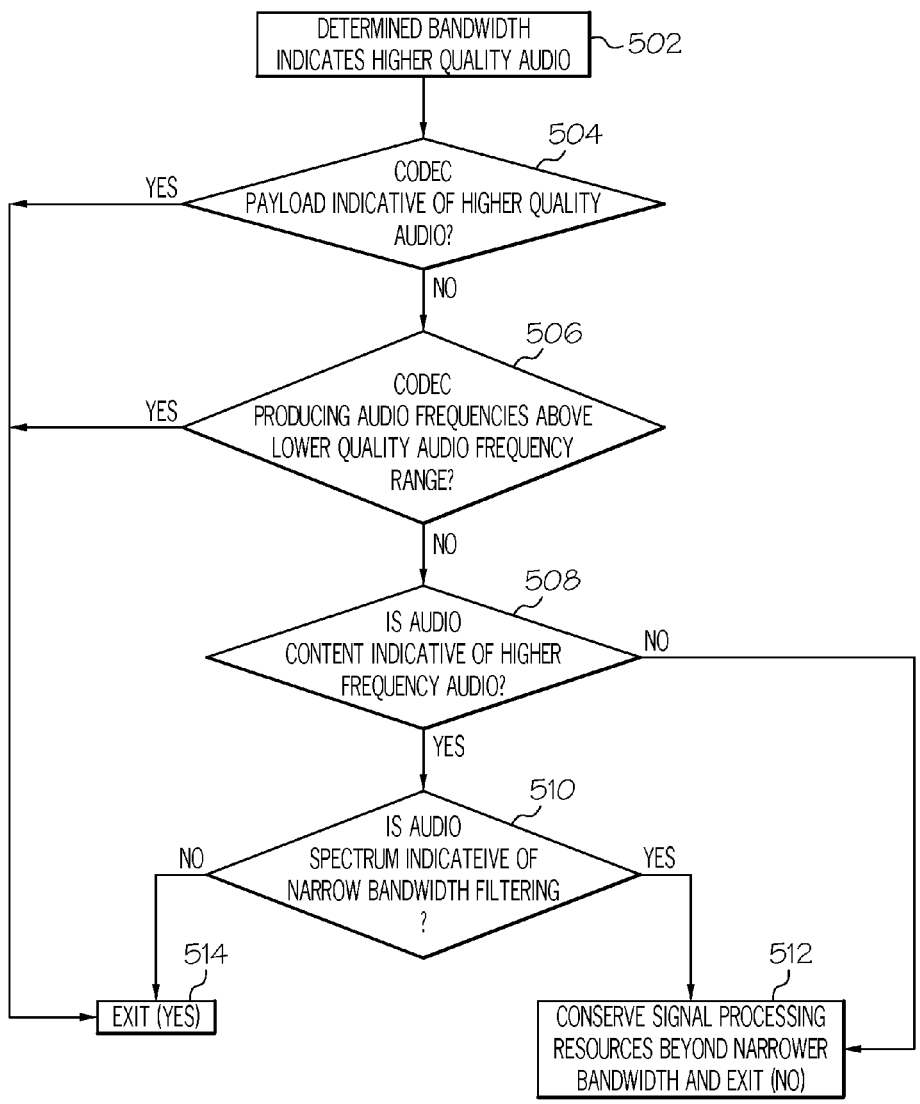
FIG. 5 illustrates a representative flow diagram for analyzing signal bandwidth.

FIG. 5 illustrates a representative flow diagram for analyzing signal bandwidth. FIG. 5 shows an example process for the determination if a bandwidth indicates a higher quality audio and corresponds to step 304 and step 404. The flow diagram is entered at step 502 and step 504 determines if the codec payload is indicative of higher quality audio. The payload is inspected to confirm if information exists which allows direct determination of audio bandwidth. For example, for the OPUS codec, the audio bandwidth is indicated directly within the first two bytes of the codec payload. For the AMR-WB codec, the high band gain index, the pitch index and the Immittence Spectral Frequencies may be analyzed in a manner familiar to those skilled in the art to determine the audio bandwidth of the signal. However, the payload may or may not be indicative of higher quality audio and step 504 determines if the codec is producing audio frequencies above a lower quality frequency range. For example, if the codec were producing a frequency at 5 kHz, it would be indicative of a higher quality audio because a G.711 system does not intend to produce such a frequency component. However, determination that the 5 kHz frequency is actually a desired signal and not a noise component or an artifact or spur of the encoding/decoding process is appropriate. Techniques for making such a determination are known to those familiar with the art and may include requiring a signal to noise ratio determination or a filtering of encoding artifact or spur frequencies or both. Also, the determination may evaluate frequencies above a target frequency. In one example, if G.711 has a maximum frequency of 3400 Hz, then the target frequency would allow for some guard band above 3400 Hz to accommodate any upper roll off frequency characteristics, thereby resulting in a 4000 Hz target frequency—for example. Thus, in this example, determining a higher audio quality of an AMR-WB system would correspond to looking for a desired signal in the frequency range of 4000 Hz to 7000 Hz while accounting for noise, spurs and artifacts. Step 506 is an example of determining if a frequency spectrum of codec output signal has a bandwidth narrower than the current bandwidth configuration of the codec. If determined, step 506 proceeds to step 514 to exit with an affirmative determination. Otherwise, step 508 determines if the audio content is indicative of higher frequency audio. In one example, a voice conversation, particularly with a speaker having a voice in the lower frequency range, may not be indicative of high frequency audio and then step 508 proceeds to step 512 to exit with a negative determination. Otherwise, if the audio content corresponds to music having a profile indicative of higher frequency audio, the process proceeds to step 510 to determine if the audio spectrum is indicative of narrow band filtering. Such filter would correspond to anti-aliasing filtering associated with a narrower bandwidth encoding codec, implemented in a transcoder for example. If detected then the process of step 510 proceeds to step 512 to exit with a negative determination and otherwise proceeds to step 514 to exit with an affirmative determination.

Step 512 includes an optional process of conserving digital signal processing resources when a narrower bandwidth is determined. The codec consumes power digitally processing a signal bandwidth corresponding to the bandwidth of the codec and the step optionally includes conserving power by processing less signal bandwidth than the bandwidth of the codec in response to the determining. The conservation includes terminating or idling processes in the codec which process frequency either above the narrower bandwidth, below the narrower bandwidth or both. This conservation has the advantage of reducing the power consumed by the digital signaling processing process resulting in a reduction in the generating on heat within the device and an improvement in battery life if a battery powered device.

It should be appreciated that any one, two or three of the four decision steps of FIG. 5 may be eliminated while still providing an affirmative or negative exit. Also, other methods of determining audio signal bandwidth may be implemented while remaining within the scope of the disclosure. Also, the process of FIG. 5 is executed in response to determination of a higher quality audio negotiated bandwidth.

Figure 6:
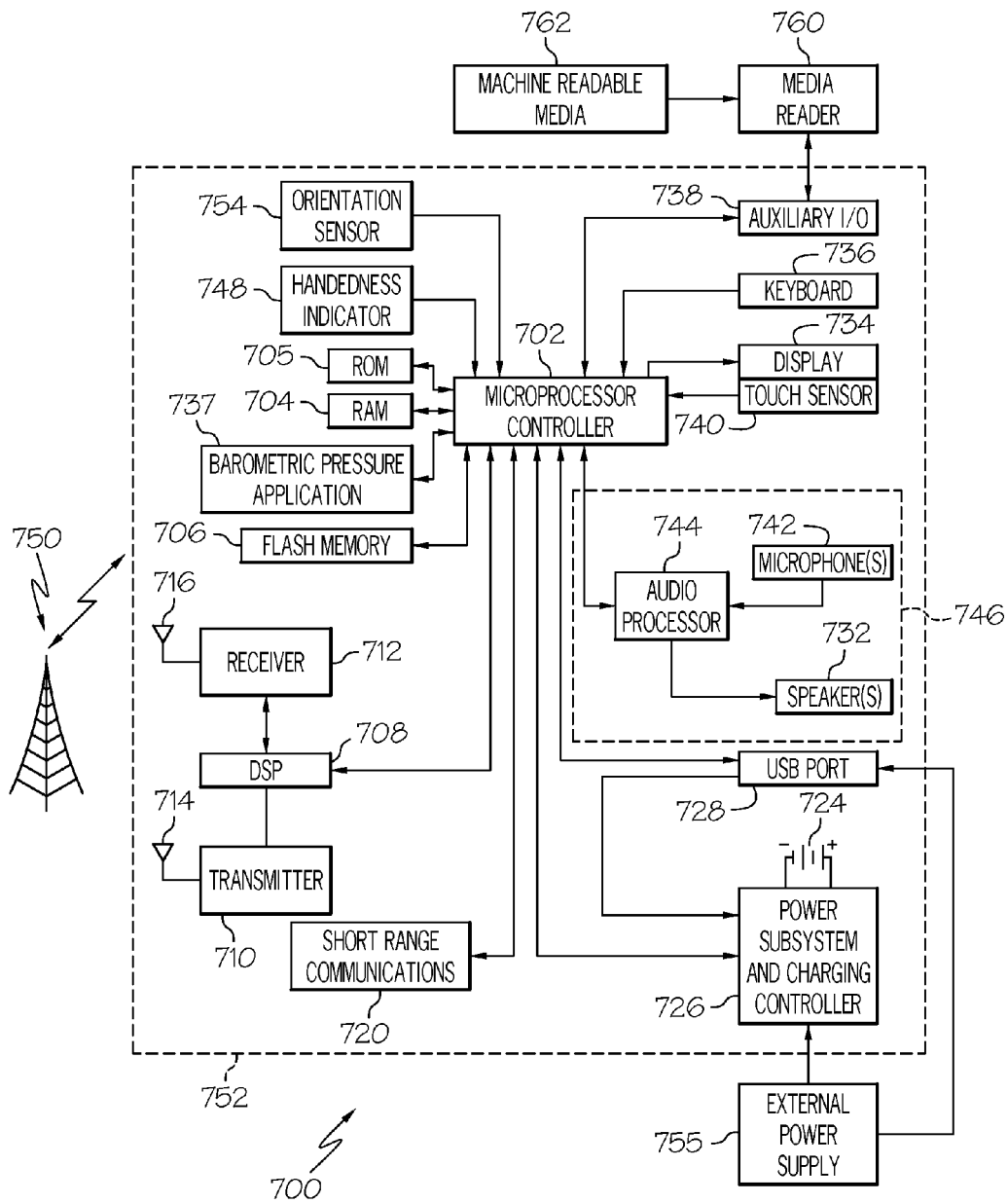
FIG. 6 illustrates a representative block diagram of an electronic device and associated components that is able to include the above described systems and perform the above described methods.

FIG. 6 illustrates a representative block diagram of an electronic device and associated components that is able to include the above described systems and perform the above described methods. In this example, an electronic device 752 is a wireless two-way communication device, such as a cell phone, with voice and data communication capabilities. Such electronic devices communicate with a wireless network 750, which is able to include a wireless voice network, a wireless data network, or both, that use one or more wireless communications protocols. Wireless voice communications are performed using either an analog or digital wireless communication channel. Data communications allow the electronic device 752 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 752 is an example electronic device that includes two-way wireless communications functions. Such electronic devices incorporate a wireless communication component that includes a wireless communications subsystem including elements such as a wireless transmitter 710, a wireless receiver 712, and associated components such as one or more antenna elements 714 and 716. A digital signal processor (DSP) 708 performs processing to extract data from received wireless signals and to generate signals to be transmitted. The particular design of the communication subsystem is dependent upon the wireless communications network and associated wireless communications protocols with which the device is intended to operate.

The electronic device 752 includes a microprocessor 702 that acts as a controller to control the overall operation of the electronic device 752. The microprocessor 702 interacts with the above described communications subsystem elements and also interacts with other device subsystems such as flash memory 706, random access memory (RAM) 704, read only memory (ROM) 705 which is a non-transitory computer readable media device that including computer instructions, auxiliary input/output (I/O) device 738, USB Port 728, display 734, touch sensor 740, keyboard 736, audio processor 744, a short-range communications subsystem 720, an orientation sensor 754, a handedness indicator 748, a power subsystem and charging controller 726, and any other device.

The electronic device 752 in one example further includes an orientation sensor 754. Various electronic devices are able to incorporate one or more orientation sensors that include, for example, accelerometer or gyroscope based orientation sensors, light sensors that are located at locations on a case of the electronic device. In some examples, the orientation sensor produces an indication of the current orientation of the electronic device relative to the ground (why is this needed?).

The electronic device 752 in one example includes an audio subsystem 746 that includes an audio processor 744, a plurality of speakers, and a plurality of microphones 742. The audio processor 744 may be any one or combination of ASIC, FPGA, microprocessor, or DSP or other type integrated circuit. Speakers 746 correspond to loudspeakers 122 of FIG. 1 and microphones 742 correspond to microphones 123 of FIG. 1. Audio processor 744 may implement some or all of the process of items 112, 114, 116, 118 and 120 of FIG. 1.

A power pack 724 is connected to a power subsystem and charging controller 726. The battery or power pack 724 provides power to the circuits of the electronic device 752. The power subsystem and charging controller 726 includes power distribution circuitry for providing power to the electronic device 752 and also contains power pack charging controller circuitry to manage recharging the power pack 724. The power pack includes a battery for making device 752 a battery operated device.

The USB port 728 provides data communication between the electronic device 752 and one or more external devices. Data communication through USB port 728 enables a user to set preferences through the external device or through a software application and extends the capabilities of the device by enabling information or software exchange through direct connections between the electronic device 752 and external data sources rather than through a wireless data communication network. The software exchange can be with microprocessor 702 or audio processor 744 or both as circumstances require.

Operating system software used by the microprocessor 702 is stored in flash memory 706 and/or ROM 705. Further examples are able to use a power pack backed-up RAM or other non-volatile storage data elements to store operating systems, other executable programs, or both. The operating system software, device application software, or parts thereof, are able to be temporarily loaded into volatile data storage such as RAM 704. Data received via wireless communication signals or through wired communications are also able to be stored to RAM 704.

The microprocessor 702, in addition to its operating system functions, is able to execute software applications on the electronic device 752. A predetermined set of applications that control basic device operations, including at least data and voice communication applications, is able to be installed on the electronic device 752 during manufacture. Examples of applications that are able to be loaded onto the device may be a barometric pressure application 737 or a personal information manager (PIM) application having the ability to organize and manage data items relating to the device user, such as, but not limited to, e-mail, calendar events, voice mails, appointments, and task items. Barometric pressure application may determine altitude or weather conditions and display the results on display 734. The altitude data may also supplement or complement altitude data determined by a global position system (GPS) application.

Further applications may also be loaded onto the electronic device 752 through, for example, the wireless network 750, an auxiliary I/O device 738, USB port 728, short-range communications subsystem 720, or any combination of these interfaces. Such applications are then able to be installed by a user in the RAM 704 or a non-volatile store for execution by the microprocessor 702.

In a data communication mode, a received signal such as a text message or web page download is processed by the communication subsystem, including wireless receiver 712 and wireless transmitter 710, and communicated data is provided the microprocessor 702, which is able to further process the received data for output to the display 734, or alternatively, to an auxiliary I/O device 738 or the USB port 728. A user of the electronic device 752 may also compose data items, such as e-mail messages, using the keyboard 736, which is able to include a complete alphanumeric keyboard or a telephone-type keypad, in conjunction with the display 734 and possibly an auxiliary I/O device 738. Such composed items are then able to be transmitted over a communication network through the communication subsystem.

For voice communications, overall operation of the electronic device 752 is substantially similar, except that received signals are generally provided to a speaker 733 and signals for transmission are generally produced by at least one of the plurality of microphones 742. Alternative voice or audio I/O subsystems, such as a voice message recording subsystem, may also be implemented on the electronic device 752. Although voice or audio signal output is generally accomplished primarily through the speaker(s) 732, the display 734 may also be used to provide an indication of the identity of a calling party, the duration of a voice call, or other voice call related information, for example.

Depending on conditions or statuses of the electronic device 752, one or more particular functions associated with a subsystem circuit may be disabled, or an entire subsystem circuit may be disabled. For example, if the power pack temperature is high, then voice functions may be disabled, but data communications, such as e-mail, may still be enabled over the communication subsystem.

A short-range communications subsystem 720 is a further optional component which may provide for communication between the electronic device 752 and different systems or devices, which need not necessarily be similar devices. For example, the short-range communications subsystem 720 may include an infrared device and associated circuits and components or a Radio Frequency based communication module such as one supporting Bluetooth® communications, to provide for communication with similarly-enabled systems and devices.

A media reader 760 is able to be connected to an auxiliary I/O device 738 to allow, for example, loading computer readable program code of a computer program product into the electronic device 752 for storage into flash memory 706 or in memory of audio processor 744. One example of a media reader 760 is an optical drive such as a CD/DVD drive, which may be used to store data to and read data from a computer readable medium or storage product such as computer readable storage media 762. Examples of suitable computer readable storage media include optical storage media such as a CD or DVD, magnetic media, or any other suitable data storage device. Media reader 760 is alternatively able to be connected to the electronic device through the USB port 728 or computer readable program code is alternatively able to be provided to the electronic device 752 through the wireless network 750.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system, or other apparatus adapted for carrying out the methods described herein, is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which, when loaded in a computer system, is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, which allow a computer to read such computer readable information.

Non-Limiting Examples

Although specific embodiments of the subject matter have been disclosed, those having ordinary skill in the art will understand that changes can be made to the specific embodiments without departing from the scope of the disclosure. The scope of the disclosure is not to be restricted, therefore, to specific embodiments or examples, and it is intended that the appended claims define the scope of the present disclosure.

For example, while the examples show a cellular network coupling to apparatus 100, any other form of wireless or wired coupling can be used. Also, while G.711 and AMR-WB codec are described, any other of a number of codecs can be used while remaining within the scope of the description.

What is claimed is:

1. A method comprising:
   determining a bandwidth set for a codec of a device, where the bandwidth is negotiated between the device and at least one other device;
   determining if the codec produces an output signal having a narrower bandwidth than the bandwidth set for the codec, the output signal being produced based on an input signal received by the device; and
   modifying an output of the device in response to determining that the output signal has a narrower bandwidth than the bandwidth set for the codec.

2. The method according to claim 1 wherein the modifying includes producing a narrowed output signal by narrowing an audio profile of the output signal.

3. The method according to claim 2 wherein the narrowing includes filtering at least one of lower frequency components and higher frequency components of the output signal.

4. The method according to claim 2 wherein the narrowing includes reducing at least one of a gain and a dynamic range of the output signal.

5. The method according to claim 2 wherein the method includes annunciating the narrowed output signal upon at least one loudspeaker of the device.

6. The method according to claim 1 wherein the codec consumes power by digitally processing a signal bandwidth corresponding to the bandwidth of the codec and the method further comprises conserving power by processing less signal bandwidth than the bandwidth of the codec in response to the determining.

7. The method according to claim 1 further comprising:
   determining if the output signal has a bandwidth corresponding to the bandwidth set for the codec; and
   the modifying further includes rendering a first icon on a display of the device in response to the output signal having the bandwidth corresponding to the bandwidth set for the codec, and at least one of terminating rendering the first icon, rendering a modified version of the first icon, and rendering a second icon in response to the output signal having the bandwidth narrower than the bandwidth set for the codec.

8. The method according to claim 1 wherein the determining includes determining an input payload of the input signal is indicative of the output signal having a bandwidth narrower than the bandwidth set for the codec.

9. The method according to claim 1 wherein the determining includes determining if a frequency spectrum of the output signal has a bandwidth narrower than the bandwidth set for the codec.

10. The method according to claim 9 wherein the determining includes determining if an upper frequency of the output signal is less than a target frequency of the bandwidth set for the codec.

11. The method according to claim 9 wherein the determining includes determining if an upper frequency of the output signal is less than a target frequency of the bandwidth set for the codec and the modifying includes filtering lower frequency components of the output signal.

12. The method according to claim 9 wherein the determining includes determining if an upper roll off characteristic of the output signal is indicative of a narrower bandwidth filter coupled to an encoder for encoding the input signal.

13. The method according to claim 1 wherein the method is included within computer instructions stored upon a non-transitory computer readable media.

14. An apparatus comprising:
    a bandwidth determiner to
    determine a bandwidth set for a codec of the apparatus, where the bandwidth is negotiated between the apparatus and at least one other apparatus;
    determine if the codec produces an output signal having a narrower bandwidth than a bandwidth set for the codec, the output signal being produced based on an input signal received by the apparatus; and
    an audio-based output controller to modify an output of the apparatus in response to determining that the output signal has a narrower bandwidth than the bandwidth set for the codec.

15. The apparatus according to claim 14 further comprising:
    a variable audio profiler coupled to the codec and the audio-based output controller to produce a narrowed output signal by narrowing an audio profile of the output signal in response to the determination; and
    the output of the apparatus includes a loudspeaker for annunciating an acoustic representation of the narrowed output signal.

16. The apparatus of claim 14 wherein the bandwidth determiner further determines if the output signal has a second bandwidth corresponding to the bandwidth set for the codec and the output of the apparatus includes a display coupled to the controller for rendering a first icon in response to the output signal having the bandwidth corresponding to the bandwidth set for the codec, and at least one of:
    terminating rendering of the first icon, rendering a modified version of the first icon, and rendering a second icon in response to the output signal having the bandwidth narrower than the bandwidth set for the codec.

17. The apparatus according to claim 14 wherein the bandwidth determiner determines if an input payload of the input signal to the codec is indicative of a frequency spectrum less than the bandwidth set for the codec.

18. The apparatus according to claim 14 wherein the bandwidth determiner determines if a frequency spectrum of the output signal is less than the bandwidth set for the codec.

19. A method comprising:
    determining a bandwidth set for a codec of a device, where the bandwidth is negotiated between the device and at least one other device;
    determining if the codec produces an output signal having a narrower bandwidth than the bandwidth set for the codec, the output signal being produced based on an input signal received by the device; and
    modifying an output of a device in response to determining that the output signal has a narrower bandwidth than the bandwidth set for the codec by at least one of:
    modifying an established audio profile for the output signal to produce a narrower output signal and annunciating the narrower output signal on a loudspeaker; and at least one of terminating rendering a first icon rendered prior to the determining, rendering a modified version of the first icon, and rendering a second icon on a display.

20. The method according to claim 19 further comprising:
determining if the codec produces an output signal having a wider bandwidth than the bandwidth set for the codec, the output signal being produced based on an input signal received by the device;
modifying the output of the device in response to determining that the output signal has a narrower bandwidth than the bandwidth set for the codec by at least one of: annunciating the established audio profile on the loudspeaker; and at least one of rendering the first icon, terminating rendering of the modified version of the first icon, and terminating rendering of the second icon on the display of the device.

* * * * *